United States Patent [19]

Stockel

[11] 4,374,743

[45] Feb. 22, 1983

[54] METHOD OF PREPARING SNOW AND ICE CONTROL COMPOSITIONS

[76] Inventor: Richard F. Stockel, 475 Rolling Hills Rd., Bridgewater, N.J. 08807

[21] Appl. No.: 203,642

[22] Filed: Nov. 3, 1980

Related U.S. Application Data

[63] Continuation-in-part of Ser. No. 38,877, May 14, 1979, abandoned.

[51] Int. Cl.³ .............................................. C09K 3/18
[52] U.S. Cl. ........................................ 252/70; 106/13; 106/DIG. 1; 264/117; 264/DIG. 49
[58] Field of Search ............... 51/308; 106/13, 36, 106/DIG. 1; 252/70; 264/DIG. 49, 117; 428/406; 23/313 R, 313 S

[56] References Cited

U.S. PATENT DOCUMENTS

| | | | |
|---|---|---|---|
| 2,308,289 | 1/1943 | Lawrence | 106/36 |
| 2,410,910 | 11/1946 | Wait | 106/36 |
| 2,626,219 | 1/1953 | Wagner | 106/36 |
| 2,946,112 | 7/1960 | Tucker et al. | 264/63 |
| 2,948,948 | 8/1960 | Duplin et al. | 264/43 |
| 3,977,892 | 8/1976 | Crossmore | 106/288 B |
| 4,092,109 | 5/1978 | Rosenberg et al. | 21/2.5 R |
| 4,108,669 | 8/1978 | Otrhalek et al. | 106/13 |
| 4,235,836 | 11/1980 | Wassell et al. | 264/333 |

FOREIGN PATENT DOCUMENTS

| | | | |
|---|---|---|---|
| 1459694 | 7/1971 | Fed. Rep. of Germany | 252/70 |
| 2107558 | 9/1972 | Fed. Rep. of Germany | 252/70 |
| 2148505 | 4/1973 | Fed. Rep. of Germany | 252/70 |
| 2512691 | 9/1976 | Fed. Rep. of Germany | 106/13 |
| 2517618 | 11/1976 | Fed. Rep. of Germany | 252/70 |
| 2288717 | 6/1976 | France | 106/36 |
| 475820 | 11/1937 | United Kingdom | 252/70 |

*Primary Examiner*—P. E. Willis, Jr.

[57] ABSTRACT

A method of preparing a snow and ice control composition to improve traction on ice and snow covered surfaces. The composition comprises coal ash, binder, a melting depressant and enough water to form a dough-like mixture with said mixture pelletized by extrusion through a die and cured to form particles ranging in size from 1/16 th to 1½ inches. The resulting said pellets have excellent strength and can be formulated to be environmentally acceptable.

6 Claims, No Drawings

METHOD OF PREPARING SNOW AND ICE CONTROL COMPOSITIONS

This application is a continuation-in-part of U.S. patent application Ser. No. 038,877 filed May 14, 1979, now abandoned.

BACKGROUND OF THE INVENTION

Snow and ice can create hazardous conditions on roads, sidewalks, parking lots, wherever there is either vehicular traffic or pedestrian traffic. It is most desirable that snow and ice control compositions meet certain criteria among which are: (1) efficiency of snow and ice control; (2) it is desirable that the snow and ice control composition is non-corrosive to metals; (3) the material should not cause any deleterious effects on road surfaces; (4) it is relatively innocuous and does no harm to the environment; (5) that it does no damage to plant, animal, or human life.

Prior art is replete with the use of sand or cinders to obtain traction, that is, to provide a gritty surface thus allowing vehicles and pedestrians to obtain traction, additionally, sodium chloride or calcium chloride pellets may be employed to melt the ice and snow; combinations of the two have also be used. In recent years attempts have been made to provide snow and ice control compositions which contain corrosion inhibiters to help prevent corrosion of metals. U.S. Pat. No. 3,630,913 teaches the use of a fluid deicer composition containing urea, ammonium nitrate, ethylene glycol, water and chromate salts to provide non-corrosiveness of both ferrous and non-ferrous materials. The use of heavy metal salts to provide non-corrosive properties is counterproductive since these materials are toxic both to humans and in large quantities to animal and plant life. Another snow and ice control composition is taught in U.S. Pat. No. 3,928,221 which contains a mixture of urea, ethylene glycol, and methanol. A more recent U.S. Pat. No. 4,108,669 teaches that a satisfactory snow and ice control composition can be prepared by the addition of 1–20% by weight of ammonium nitrate by applying an aqueous solution of ammonium nitrate onto calcined montmorillonite.

Older patent references include U.S. Pat. No. 2,308,289 which teaches the use of sand containing sodium chloride. Similarily U.S. Pat. No. 2,410,910 teaches the same use of sodium chloride being contained within cinder particles. Several foreign patents, specifically Ger. Pat. No. 1,459,684 teaches the use of treating pumice, a natural porous volcanic rock treated with urea. Other combinations are found in subsequent foreign patents. For example Ger. Pat. No. 2,148,505 teaches the use of glycol or some other similar polyhydroxy compounds adsorbed onto mineral wool, sand or gravel while Ger. Pat. No. 2,517,618 teaches the addition of adding carbon soot to salt.

Despite this voluminous number of patent citations the fact remains that all of the prior art have very serious limitations. These limitations include, poor leachability of a solute from a particle; poor crush resistant properties, so as to minimize traction; environmentally unsound snow and ice compositions causing serious damage to roads and causing irreversible environmental damage; or being inneffective in lowering the melting point to cause the snow and ice to change from a solid to a liquid state.

SUMMARY OF THE INVENTION

Coal ash, the residue after coal undergoes combustion, is becoming one of the most abundant materials in the world. Today it ranks six in availability. World projections indicate it will climb higher in ranking in the very near future. From an economical and environmental point of view, it would be helpful to utilize coal ash rather than having to bury it as landfill. Coal ash is cheap and in fact many times utility companies have to pay truckers to hall it away. It has been discovered that a suitable ice and snow control composition can be prepared by manufacturing pellets from coal ash which contain a highly specific binder at certain concentration levels plus certain salts which can lower the melting point of solid water. The binder is an aqueous solution of sodium or potassium silicate within a specified range of silica/alkali oxide ratio. The salt can be sodium chloride, calcium chloride, or a non-corrosive type salt such as ammonium nitrate. Additionally, certain water soluble organic materials such as urea can also be employed in place of the salt or in combination thereof. In all cases dealing with coal ash, it is preferred that the coal ash is finely ground up and thoroughly mixed with the binder and salt and then pelletized.

Throughout the description of the invention the wording "coal ash" can mean either fly ash, bottom ash, and/or boiler slag. In addition combinations of any of the three can also constitute coal ash as used in this invention.

TABLE 1

| Rank | VARIATIONS IN COAL ASH COMPOSITION WITH RANK | | | | | | | | | |
|---|---|---|---|---|---|---|---|---|---|---|
| | % $SiO_2$ | % $Al_2O_3$ | % $Fe_2O_3$ | % $TiO_2$ | % CaO | % MgO | % $Na_2O$ | % $K_2O$ | % $SO_3$ | % Ash |
| Anthracite | 48–68 | 25–44 | 2–10 | 1.0–2 | 0.2–4 | 0.2–1 | — | — | 0.1–1 | 4–19 |
| Bituminous | 7–68 | 4–39 | 2–44 | 0.5–4 | 0.7–36 | 0.1–4 | 0.2–3 | 0.2–4 | 0.1–32 | 3–32 |
| Subbituminous | 17–58 | 4–35 | 3–19 | 0.6–2 | 2.2–52 | 0.5–8 | — | — | 3.0–16 | 3–16 |
| Lignite | 6–40 | 4–26 | 1–34 | 0.0–0.8 | 12.4–52 | 2.8–14 | 0.2–28 | 0.1–1.3 | 8.3–32 | 4–19 |

DESCRIPTION OF THE PREFERRED EMBODIMENT

This invention relates to a method of preparing a snow and ice control composition for improving both vehicle and pedestrian traction on ice and snow covered surfaces by employing said compositions. Although the composition of coal ash varies to some degree with the type of coal that is burned as well as the manner in which the coal is burned generally the amount of binder and the melting point depressant component will vary within specified limits. Table I lists the composition of different types of coal ash residue. The soft coal and lignite types contain more soluble alkali oxides than anthracite and bituminous type coals. In using a wide variety of coal ash from various geographical locations, it was found that from 10 to 40% by weight of sodium or potassium silicate should be used with a preferred range from 15 to 35% by weight based on the weight of coal ash. In addition, a very important further restriction on the silicate binder involves the silica/alkali oxide ratio. The best results in terms of binding ability and the resulting crush strength of the pellet occur when this ratio ranges from 3.50 to 2.00. Above and below this ratio, the binding ability and resulting crush strengths are not acceptable. The preferred range is from 3.22 to 2.22. The optimum ratio appears to be approximately 2.40. Furthermore, it has been found experimentally that from 1 to 40 parts by weight of a salt and/or organic water soluble compound can be added to the above formulation to lower the melting point of snow or ice. A preferred amount of salt and/or water soluble organic compound is in the area of 15 to 30 parts by weight based on the weight of coal ash. The preferred melting point depressant is either ammonium nitrate or urea since these are both economically and environmentally sound although both sodium chloride and calcium chloride can also be used but are less preferred. This is true when the latter corrosive salts are used on roadways which have steel reinforcing rods under them and/or where the salt runoff can cause damage to animal and/or plant life. Another advantage of this invention over that of U.S. Pat. No. 4,108,669 is the fact that the desired product does not have to be calcined. Therefore, the method of preparing this snow and ice composition is not energy intense. This is due to the unique feature of the silicate binder which can be polymerized at temperatures as low as 100° C. by forming an effective network holding all of the coal ash and salt particles tightly in place. The process in general involves mixing the coal ash with the preferred amount of silicate and salt and/or organic water soluble compound with a small amount of water to form a dough-like mixture. This mixture is then pelletized by passing the paste of a suitable consistency through a conventional extruder. The extruder may vary in size, shape, or configuration depending on the size and shape of the die, and may be chopped into the desired pellet size for example 1/16 to 1 inch by conventional means. Other size enlargement techniques can be accomplished by:

1. Pressure compaction;
2. Agglomeration by tumbling;
3. Sintering and heat hardening.

These processes are described by Perry and Chitton "Size Enlargement" Chem. Eng. Handbook (5th Ed.), Sec. 8, p. 57 et seq.

It has been found that the coal ash used should be ground up into small particles. While fly ash is generally from 1–400 microns in particle size both bottom ash and boiler slag found in much large particle size and should be ground to a fine powder so that it can be mixed with the binder and salt and/or water soluble organic compound for preparation to make the pellets. It has been found that the pellet size should be from about a 1/16 to about 1 inch in size and should have sufficient crush strength to also function as a traction agent. Experimentally, it has been found that adequate crush strength for this use ranges from 4 to 150 psi with a preferred minimal crush strength of about 25 psi. In order to achieve this desirable crush strength it is necessary to cure the pellet which contains coal ash, binder, and a melting point depressant additive. It is well known that silicate can be polymerized, or cured, at temperatures as low as 100° C. to remove the by-product water. It is not desirable to do so at this temperature due to the slowness of the reaction, therefore, it has been found that heat treatment from 200° to 600° C. constitutes an acceptable range for curing the mixture with a preferred cure range of 300° to 500° C. Other advantages of the invention are its general applicability, covering a broad range of coal ash materials; the use of different salts and organic water soluble compounds as melting point depressants; and the use of specific silicate binders having an effective silica/alkali oxide ratio of from 3.22 to 2.22. Another advantage in practicing this invention involves economic savings over prior art teachings. Coal ash materials are available in almost every state with over 500 power stations using coal as a fuel. Future projections indicate an even greater number of coal burning facilities within the next decade. On the other hand, clay, rock salt and the other materials used as snow and ice compositions as described in prior inventions are not nearly as widely located as is coal ash. Therefore, considerable savings in transportation can be realized utilizing this invention.

The following examples will serve to illustrate the effectiveness of coal ash, silicate binder, and melting point depressant additives as useful ingredients as snow and ice compositions to increase traction and/or causing melting point depression of snow and ice. These examples, however, are merely illustrations and do not limit the scope of this invention.

EXAMPLE I

A snow and ice control composition was prepared by adding 55 parts of sodium silicate which had a silica/sodium oxide ratio of 2.40 to 140 grams of Will County fly ash, with subsequent addition of 20 grams of ammonium nitrate dissolved in 50 grams of water. All of these materials were mixed together to form a dough-like substance and extruded to form pellets. The pellets were then heated to 300° C. to remove excess water and polymerize the silicate binder. These pellets along with the control of the same composition, except the control did not contain ammonium nitrate were put on ice prepared by adding ½ inch of water to shallow metal dishes which were frozen. They were put into a freezer compartment of a refrigerator at approximately 0° C. and within one hour there was a noticeable difference between the control and the salt containing fly ash pellets. The latter caused considerable convolutions on the surface of the ice.

EXAMPLE II

On a cold wintery afternoon, with the temperature at approximately 31° F. two snow and ice compositions were prepared identically to that explained in example I. The two compositions were utilizing sodium silicate of different silica/sodium oxide ratios. In one case the ratio was 2.40 while in the other case the ratio was 3.75. These pelletized materials were then put on a patch of snow and ice for comparative testing. An automobile was driven over the snow and ice composition containing the silica/sodium oxide ratio of 2.4 whereby the pellets withstood the pressure and, thus, gave considerable traction. On the other hand, the snow and ice composition pellets containing the silica/sodium oxide ratio of 3.75 crushed readily and traction was virtually non-existent.

EXAMPLE III

One hundred-forty parts of bottom ash obtained from the Hudson Generating Station in Jersey City, N.J. was crushed to a particle size of less than 1 millimeter in diameter. The bottom ash was then treated with a concentrated solution of urea (60 parts of urea in 100 parts of water) with 60 grams of a sodium silicate having a silica/sodium oxide ratio of 2.50. The resulting dough-like mixture was then extruded into pellets and tested as described in example 1. The results were positive causing considerable melting compared to an untreated pellet made from the same bottom ash and binder but not containing urea.

EXAMPLE IV

A series of pellets utilizing fly ash from Will County Generating Station in Minnesota and sodium silicate of various ratios were prepared containing 20% calcium chloride. Sufficient water was added to cause a dough-like substance and the mixtures were then pelletized and cured at 325° C. for approximately one hour. The pellets were then tested for their crush strength and measured in psi.

| Run Number | Silica/Sodium Oxide Ratio | Crush Strength (psi) |
| --- | --- | --- |
| 1 | 3.75 | 0 |
| 2 | 3.22 | 15.5 |
| 3 | 2.4 | 78.0 |

What is claimed:

1. A method of preparing a snow and ice control composition comprising the steps of combining a coal ash material, a salt and/or organic material for lowering the melting point of snow or ice, a silicate finding agent having a silica/alkali metal oxide ratio of 3.50 to 2.00 and enough water to form a dough-like workable mixture; pelletizing said mixture and heating said pellets to form shaped particles having excellent crush resistance.

2. The method of claim 1 wherein said pelletized snow and ice control particle is heated at a temperature of 100° C. or above to cause polymerization of said silicate binder.

3. The method of claim 1 wherein the coal ash material is fly ash.

4. The method of claim 1 wherein the coal ash material is bottom ash.

5. The method of claim 1 wherein the coal ash material is boiler slag.

6. The method of claim 1 wherein the binding agent is sodium or potassium silicate with a silica/alkali metal oxide ratio from 3.50 to 2.00, containing from 15%–35% by weight of the silicate based on the weight of the coal ash.

* * * * *